United States Patent
Wijbrans et al.

(10) Patent No.: US 10,379,290 B2
(45) Date of Patent: Aug. 13, 2019

(54) OPTICAL FIBER CONNECTOR

(71) Applicant: KONINKLIJKE PHILIPS N.V., Eindhoven (NL)

(72) Inventors: Klass Cornelis Jan Wijbrans, Eindhoven (NL); Gerhardus Wilhelmus Lucassen, Eindhoven (NL); Bernardus Hendrikus Wilhelmus Hendriks, Eindhoven (NL); Christian Reich, Eindhoven (NL); Peter Douglas Fairley, Eindhoven (NL); Waltherus Cornelis Jozef Bierhoff, Eindhoven (NL); Johannes Antonius Van Rooij, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/102,686

(22) PCT Filed: Nov. 19, 2014

(86) PCT No.: PCT/EP2014/074953
§ 371 (c)(1),
(2) Date: Jun. 8, 2016

(87) PCT Pub. No.: WO2015/086272
PCT Pub. Date: Jun. 18, 2015

(65) Prior Publication Data
US 2016/0320571 A1   Nov. 3, 2016

(30) Foreign Application Priority Data

Dec. 9, 2013 (EP) ..................................... 13196232
Sep. 18, 2014 (EP) ..................................... 14185313

(51) Int. Cl.
G02B 6/26 (2006.01)
G02B 6/38 (2006.01)
G02B 6/32 (2006.01)

(52) U.S. Cl.
CPC ............... G02B 6/262 (2013.01); G02B 6/32 (2013.01); G02B 6/3874 (2013.01);
(Continued)

(58) Field of Classification Search
CPC ......... G02B 6/32; G02B 6/262; G02B 6/3874
(Continued)

(56) References Cited

U.S. PATENT DOCUMENTS 3,944,327 A * 3/1976 Larsen .................. G02B 6/243
385/58
4,420,219 A * 12/1983 Muchel ................ G02B 6/2817
385/25

(Continued)

FOREIGN PATENT DOCUMENTS

CN     201311326 Y    9/2009
EP      0417507 A1    3/1991
(Continued)

OTHER PUBLICATIONS

Chapter 4 "The propagation of light", Lecture 9 of Physics Course 322 at Perdue University.*

(Continued)

*Primary Examiner* — Robert Tavlykaev

(57) ABSTRACT

The present invention relates to an optical fiber connector arrangement that finds application in the general field of optical interconnection. The optical fiber connector arrangement (935) comprises a first optical fiber connector (922) including a first optical fiber (905) and a counterpart optical fiber connector (923) including a counterpart optical fiber (925); wherein the first optical fiber connector (922) is (Continued)

configured to mate with the counterpart optical fiber connector (923). The first optical fiber (905) of the first optical fiber connector (922) has a core diameter D1 and a Numerical Aperture NA1; and the counterpart optical fiber (925) of the counterpart optical fiber connector (923) has a counterpart core diameter D2 and a counterpart Numerical Aperture NA2. At least one of the ratio (D1/D2) or the ratio (NA1/NA2) either exceeds 1.15 or is less than 0.85.

15 Claims, 6 Drawing Sheets

(52) U.S. Cl.
CPC .......... *G02B 6/3834* (2013.01); *G02B 6/3847* (2013.01); *G02B 6/3855* (2013.01); *G02B 6/3865* (2013.01)

(58) Field of Classification Search
USPC .................................. 385/60, 72, 74, 93
See application file for complete search history.

(56) References Cited

U.S. PATENT DOCUMENTS

| | | | | |
|---|---|---|---|---|
| 4,421,383 | A * | 12/1983 | Carlsen | G02B 6/32 385/72 |
| 4,705,351 | A * | 11/1987 | Toda | G02B 6/4206 385/33 |
| 4,783,137 | A | 11/1988 | Kosman | |
| 4,796,969 | A * | 1/1989 | Fantone | G02B 6/32 385/35 |
| 5,002,812 | A | 3/1991 | Umehara | |
| 5,121,454 | A | 6/1992 | Iwano | |
| 5,210,815 | A | 5/1993 | Alexander | |
| 6,837,625 | B2 * | 1/2005 | Schott | G02B 6/4248 385/60 |
| 8,123,417 | B2 * | 2/2012 | Wertman | G02B 6/3869 385/60 |
| 9,519,108 | B1 * | 12/2016 | Guiffault | G02B 6/322 |
| 2003/0165297 | A1 | 9/2003 | Dultz | |
| 2004/0146254 | A1 | 7/2004 | Morrison | |
| 2004/0258364 | A1 * | 12/2004 | Frojdh | G02B 6/32 385/74 |
| 2006/0045409 | A1 | 3/2006 | Tatum | |
| 2007/0172174 | A1 * | 7/2007 | Scerbak | G02B 6/4296 385/76 |
| 2007/0292087 | A1 | 12/2007 | Brown | |
| 2007/0292987 | A1 | 12/2007 | Yoon | |
| 2008/0131060 | A1 * | 6/2008 | Hu | G02B 6/4478 385/92 |
| 2010/0008676 | A1 | 1/2010 | Kojima | |
| 2010/0104244 | A1 * | 4/2010 | Grinderslev | G02B 6/3874 385/74 |
| 2012/0057829 | A1 | 3/2012 | Benjamin | |
| 2012/0134630 | A1 * | 5/2012 | Tsujita | G02B 6/138 385/78 |
| 2013/0039622 | A1 * | 2/2013 | Grinderslev | G02B 6/3874 385/61 |
| 2013/0177280 | A1 * | 7/2013 | Nielson | G02B 6/32 385/79 |
| 2013/0216186 | A1 | 8/2013 | Ott | |
| 2013/0322821 | A1 | 12/2013 | Grinderslev | |
| 2015/0063765 | A1 * | 3/2015 | Bhagavatula | G02B 6/32 385/93 |
| 2015/0268418 | A1 * | 9/2015 | Sevigny | G02B 6/32 385/50 |

FOREIGN PATENT DOCUMENTS

| | | |
|---|---|---|
| EP | 1020742 A2 | 7/2000 |
| GB | 2397392 A | 7/2004 |
| JP | S61228405 A | 10/1986 |
| WO | 2008024604 A2 | 2/2008 |
| WO | 2011047111 A1 | 4/2011 |

OTHER PUBLICATIONS

Wikipedia article entitled "Scattering".*
Lecture 34 "Electromagnetic Scattering" of course ECE 303 at Cornell University.*
Nachabe, B. et al "Estimation of Lipid and Water Concentrations in Scattering Media with Diffuse Optical Spectroscopy from 900 to 1600 nm", Journal of Biomedical Optics, vol. 15, 2010.
Farrell, Thomas J. et al "A Diffusion Theory Model of Spatially Resolved, Steady-State Diffuse Reflectance for the Noninvasive Determination of Tissue Optical Properties in vivo", Med. Phys. vol. 19, No. 4, 1992.

* cited by examiner

OPTICAL FIBER CONNECTOR

CROSS-REFERENCE TO PRIOR APPLICATIONS

This application is the U.S. National Phase application under 35 U.S.C. § 371 of International Application No. PCT/EP2014/074953, filed on Nov. 19, 2014, which claims the benefit of European Patent Application No. 13196232.6, filed on Dec. 9, 2013 and European Patent Application No. 14185313.5, filed on Sep. 18, 2014. These applications are hereby incorporated by reference herein.

FIELD OF THE INVENTION

The present invention relates to an optical fiber connector for interconnecting optical fibers. An optical fiber connector arrangement and housing that include the optical fiber connector are also described. A method of manufacture of the optical fiber connector is also described. The invention finds application in the general field of optical connectors, and more particularly finds exemplary use in optically interfacing a tissue-sensing optical needle with a spectrophotometer device in the medical field.

BACKGROUND OF THE INVENTION

Optical fibers connectors are used to terminate optical fibers. An optical fiber connector and a complementary optical fiber connector may be used to mechanically retain two optical fibers such that light carried by one optical fiber may couple into the other fiber to form a light-transmitting path between the optical fibers. A multitude of optical fiber connector types have been developed over the years for specific purposes. The well-known FC-type optical fiber connector for example offers high alignment accuracy with up to 500 mating cycles and finds application in the telecommunications field where a small misalignment between the optical fiber cores results in significant optical insertion losses. Other, lower cost optical fibers have also been developed. At least two categories of optical fiber connectors include physical-contact connectors and expanded-beam connectors. Physical contact connectors operate by bringing the cores of the two optical fibers that are to be interconnected into physical contact, and variously suffer from the need for high alignment tolerance manufacturing processes and degraded lifetime following successive mating cycles. Expanded beam connectors such as disclosed in patent application WO2008/024604A2 typically include a lens at the face of each of the two optical fibers to expand the optical beam such that the interface between the two connectors occurs within the expanded beam region via an air gap. The expanded beam minimises the impact of misalignment on the insertion loss of the connector, and the airgap alleviates the mechanical wear associated with physical contact connectors, thereby reducing the impact of trapped dust particles on the optical fiber end faces and improving the number of mating cycles.

The constraints of high mating cycles and low insertion losses placed upon conventional optical fiber connectors however typically increase the cost of optical fiber connectors. High connector costs may prohibit the use of such connectors in applications such as the medical field where optical fiber connectors may form part of a disposable device. In one exemplary application a so-called photonic needle disclosed in document • Estimation of lipid and water concentrations in scattering media with diffuse optical spectroscopy from 900 to 1600 nm•, J. Biomed. Opt. 15, 037015 (2010) by R. Nachabé, B. H. W. Hendriks, A. E. Desjardins, M. van der Voort, M. B. van der Mark, and H. J. C. M. Sterenborg•, uses optical fibers to deliver light and perform spectral sensing measurements at the tip of a needle in order to analyse tissue that is in contact with the needle tip. Owing to the complexities of sterilisation, the needle device is typically discarded after a single use. Consequently a need has arisen for low cost optical fiber connectors for use in disposable optical device applications.

SUMMARY OF THE INVENTION

It is an object of the invention to provide an optical fiber connector that may be used to couple light between two optical fibers. Another object of the invention is to provide an optical fiber connector with improved optical transfer characteristics. Another object of the invention is to provide an optical fiber connector with relaxed alignment tolerance. Another object of the invention is to provide a low cost optical fiber connector. Another object of the invention is to provide an optical fiber connector which facilitates the confirmation of the identity of a corresponding optical fiber. Other objects of the invention include provision of a simplified manufacturing process for an optical fiber connector.

According to one aspect of the invention an optical fiber connector comprises a body having a bore that is configured to receive an optical fiber. The optical fiber connector further includes an optical fiber having an end face and a core that is surrounded by a cladding layer; wherein the cladding layer is surrounded by a buffer layer for at least a portion of the axial extent of the optical fiber. The optical fiber is arranged within the bore.

According to another aspect of the invention an optical fiber connector comprises a body having a bore that is configured to receive an optical fiber. The optical fiber connector optionally further includes an alignment sleeve that is arranged coaxially with the bore. The optical fiber connector further includes an optical fiber having an end face and a core that is surrounded by a cladding layer; wherein the cladding layer is surrounded by a buffer layer. The optical fiber is arranged within the bore; and at least at the end face of the optical fiber the buffer layer of the optical fiber surrounds the cladding layer.

The conventional method of assembling an optical fiber connector is to strip the buffer layer from the optical fiber at its tip. The stripped tip is then inserted into a ferrule and the optical fiber is fixed within the ferrule with adhesive. The optical fiber is then cleaved to remove excess fiber at the tip, and polished back to the end face of the ferrule. Consequently the conventional method of assembling an optical fiber connector results in the portion at its tip comprising a core that is surrounded by a cladding layer, which is itself surrounded by adhesive that is surrounded by the ferrule. In the present invention the buffer layer is present at the tip of the optical fiber. The technical effect of leaving the buffer on the optical fiber is a simplified manufacturing process because the optical fiber is not stripped prior to the assembly of the connector. The robustness of the manufacturing process is further improved because during assembly of the optical fiber connector the buffer layers fs presence makes the optical fiber more robust and less prone to breakage. Advantageously it has been found that when the optical fiber connector is constructed in this way the optical fiber is adequately mechanically fixed within the connector body.

The optional alignment sleeve operates to improve alignment of the optical fiber connector with a corresponding optical fiber connector. In one configuration an alignment sleeve is arranged coaxially with the bore of the optical fiber connector for improving the alignment of an optical fiber within the bore with a corresponding optical fiber in the bore of a corresponding optical fiber connector. In another configuration the optical fiber connector has an axis and an alignment sleeve is arranged coaxially with the optical fiber connector axis. In this configuration the optical fiber that is aligned with the axis of its connector may likewise be aligned with corresponding optical fiber in a similar optical fiber connector. The latter configuration allows, for example, for the alignment of optical fiber connectors where the connector has an axis that is not aligned with the bore, and, for example, for the alignment of optical fiber connectors wherein each optical fiber connector has more than one optical fibers, or more than one bore. In other configurations there is no optical alignment sleeve. Other alignment features such as alignment pins, alignment notches or alignment groves may alternatively or additionally be used to improve alignment of the optical fiber connector with a corresponding optical fiber connector.

According to an another aspect of the invention an optical fiber connector comprises a body having a bore that is configured to receive an optical fiber. The optical fiber connector optionally further includes an alignment sleeve that is arranged coaxially with the bore. The optical fiber connector further includes an optical fiber having an end face and a core that is surrounded by a cladding layer; wherein the cladding layer is surrounded by a buffer layer. The optical fiber is arranged within the bore. In this aspect of the invention the conventional method of assembling an optical fiber connector is used wherein the buffer layer is removed from the optical fiber at its tip.

The various aspects of the optical fiber connector may be used together or in isolation in an optical fiber connector arrangement, or in an optical fiber connector housing.

Other aspects of the invention are described in the claims and associated Figures.

DETAILED DESCRIPTION OF THE INVENTION

Figure 1:
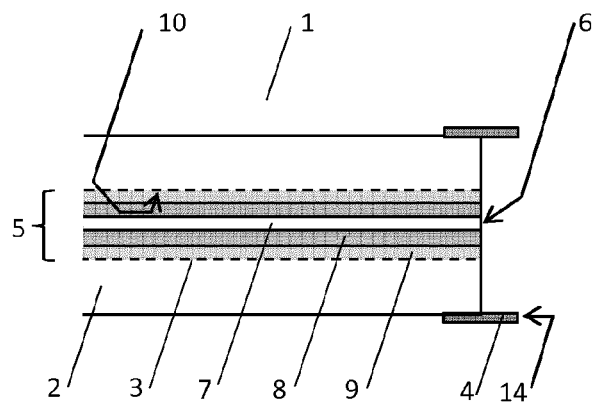
FIG. 1 illustrates an optical fiber connector (1) according to some aspects of the present invention.
Figure 2:
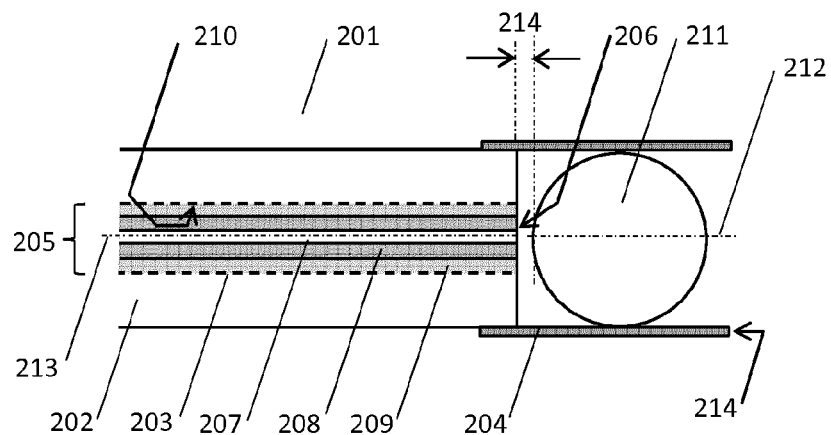
FIG. 2 illustrates an optical fiber connector (201) having a positive lens (211) wherein there is a gap (214) between the end face of the optical fiber and the positive lens.
Figure 3:
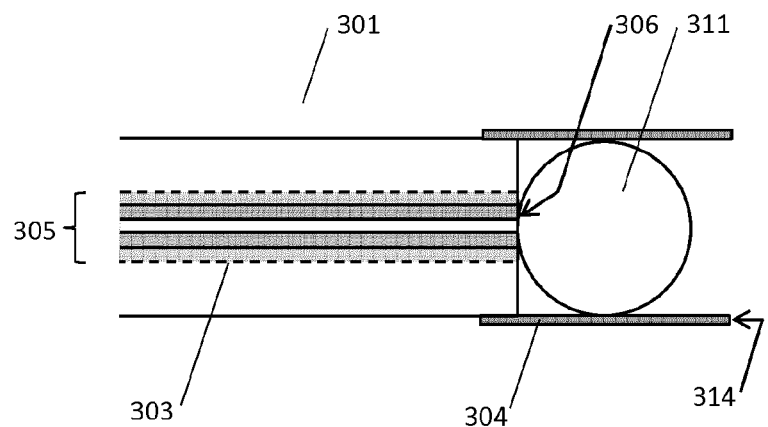
FIG. 3 illustrates an optical fiber connector (301) having a positive lens (311) wherein the end face of the optical fiber (206) and the positive lens are in contact.
Figure 4:
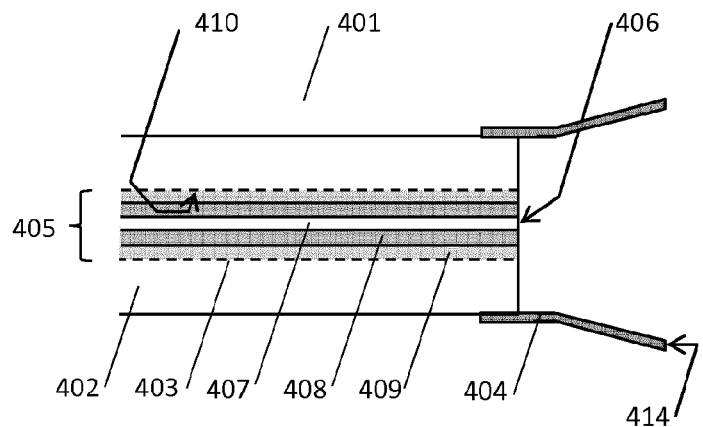
FIG. 4 illustrates an optical fiber connector (401) having a tapered alignment sleeve (414).
Figure 5:
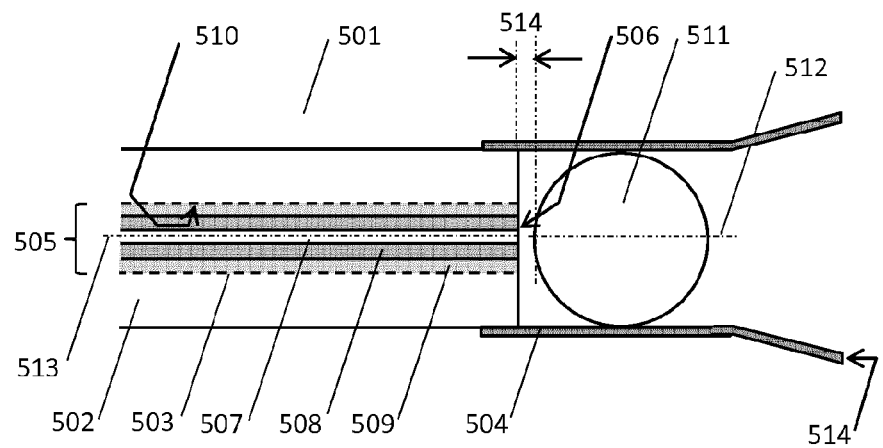
FIG. 5 illustrates an optical fiber connector (501) having a tapered alignment sleeve (514) and a positive lens (511) wherein there is a gap (514) between the end face of the optical fiber and the positive lens.
Figure 6:
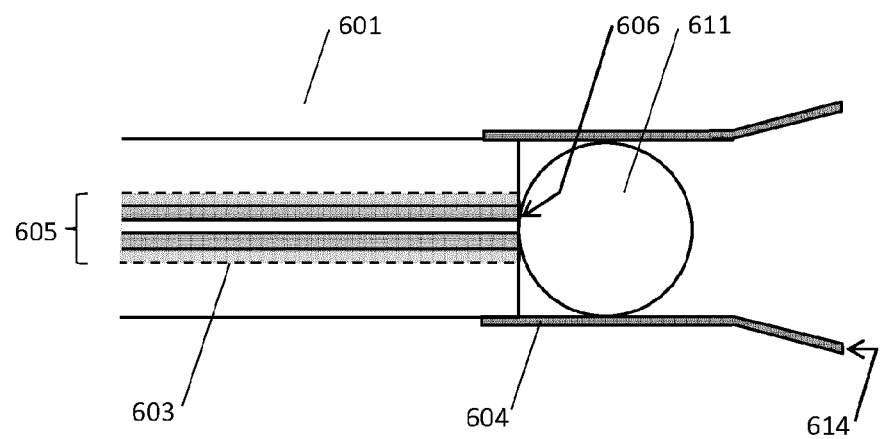
FIG. 6 illustrates an optical fiber connector (601) having a positive lens (611) wherein the end face of the optical fiber (606) and the positive lens are in contact.
Figure 7:
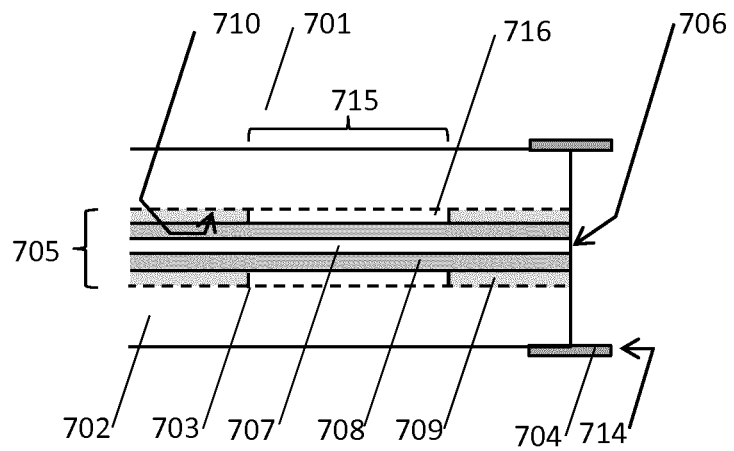
FIG. 7 illustrates an optical fiber connector (701) wherein for at least a portion (715) of the axial extent of the bore (703) the buffer layer (709) is removed and the cladding layer (708) is in optical contact with the body (702) via an optical medium (716).
Figure 8:
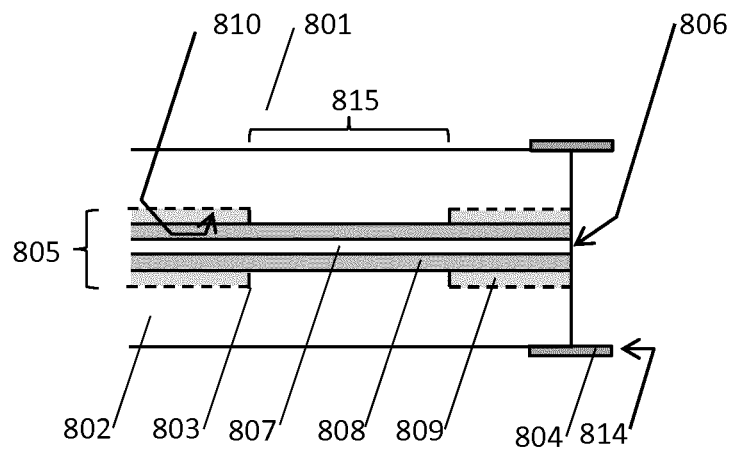
FIG. 8 illustrates an optical fiber connector (801) wherein for at least a portion (815) of the axial extent of the bore (803) the buffer layer (809) is removed and the cladding layer (808) is in contact with the body (802).
Figure 9:
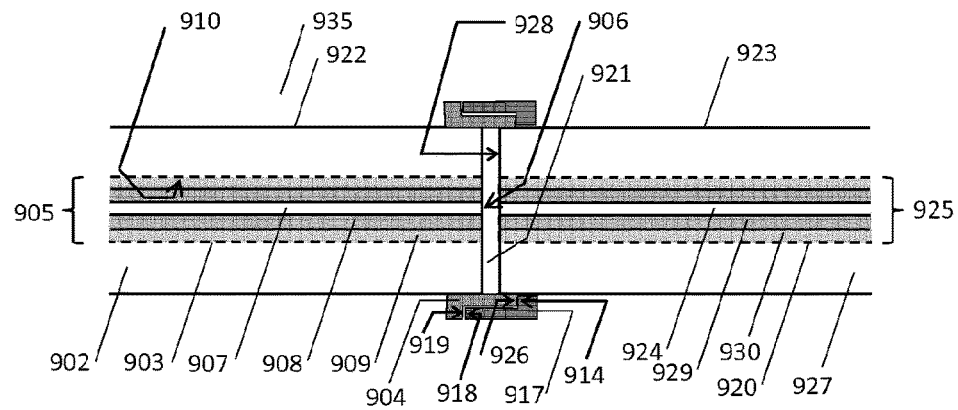
FIG. 9 illustrates an optical fiber connector arrangement (935) comprising a first optical fiber connector (922) that is mated with a corresponding counterpart optical fiber connector (923).
Figure 10:
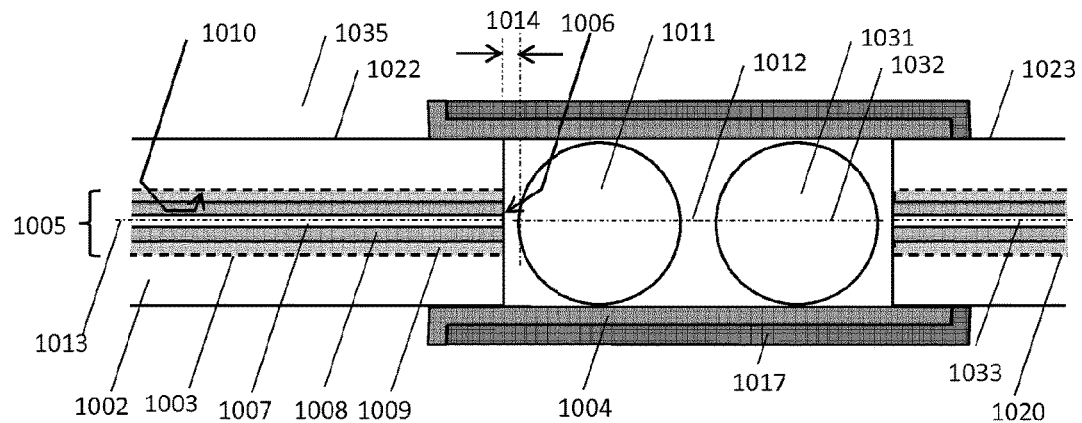
FIG. 10 illustrates an optical fiber connector arrangement (1035) having a first optical fiber connector (1022) that includes a positive lens (1011) and a counterpart optical fiber connector (1023) that includes a corresponding counterpart positive lens (1031).
Figure 11:
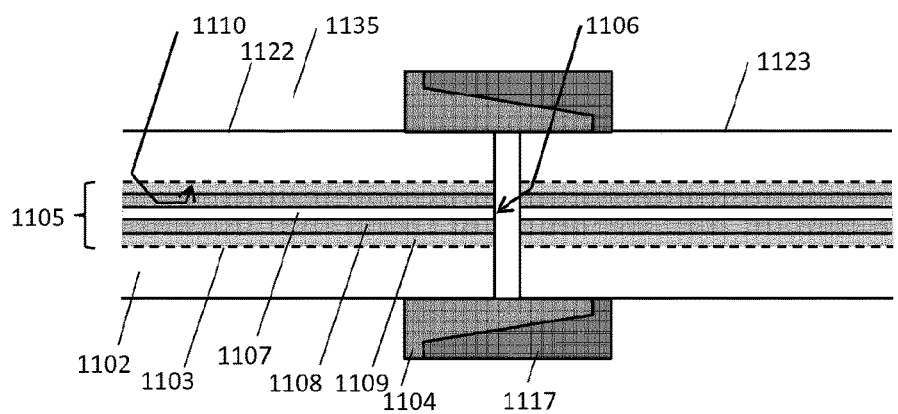
FIG. 11 illustrates an optical fiber connector arrangement (1135) wherein a first optical fiber connector (1122) and a counterpart optical fiber connector (1123) each have a tapered alignment sleeve (1104, 1117) wherein the alignment sleeve (1104) of the first optical fiber connector (1122) has an outer diameter that is configured to fit within the inner diameter of the counterpart alignment sleeve (1117) of the counterpart optical fiber connector (1123).
Figure 12:
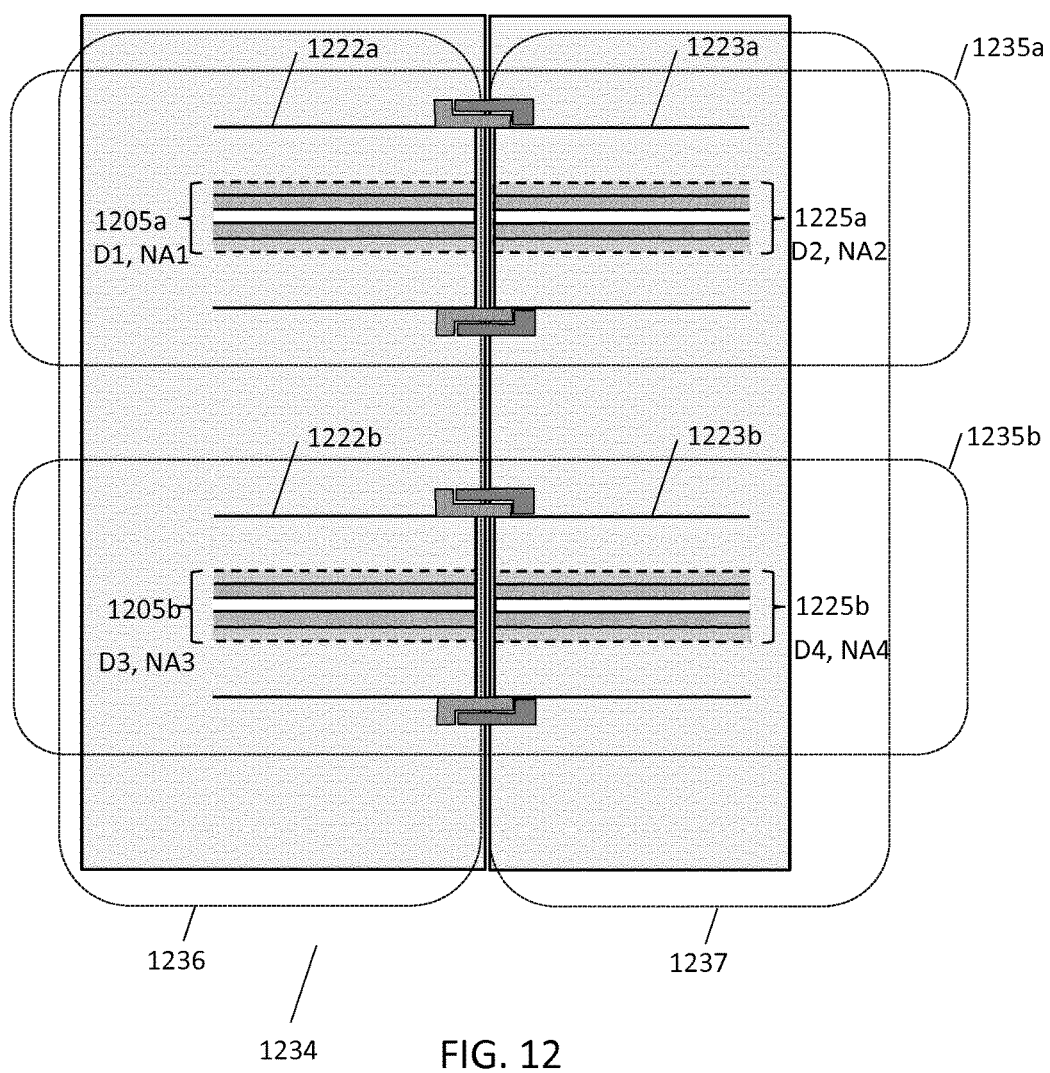
FIG. 12 illustrates an optical fiber connector housing (1234) comprising two optical fiber connector arrangements (1235a, 1235b).
Figure 13:
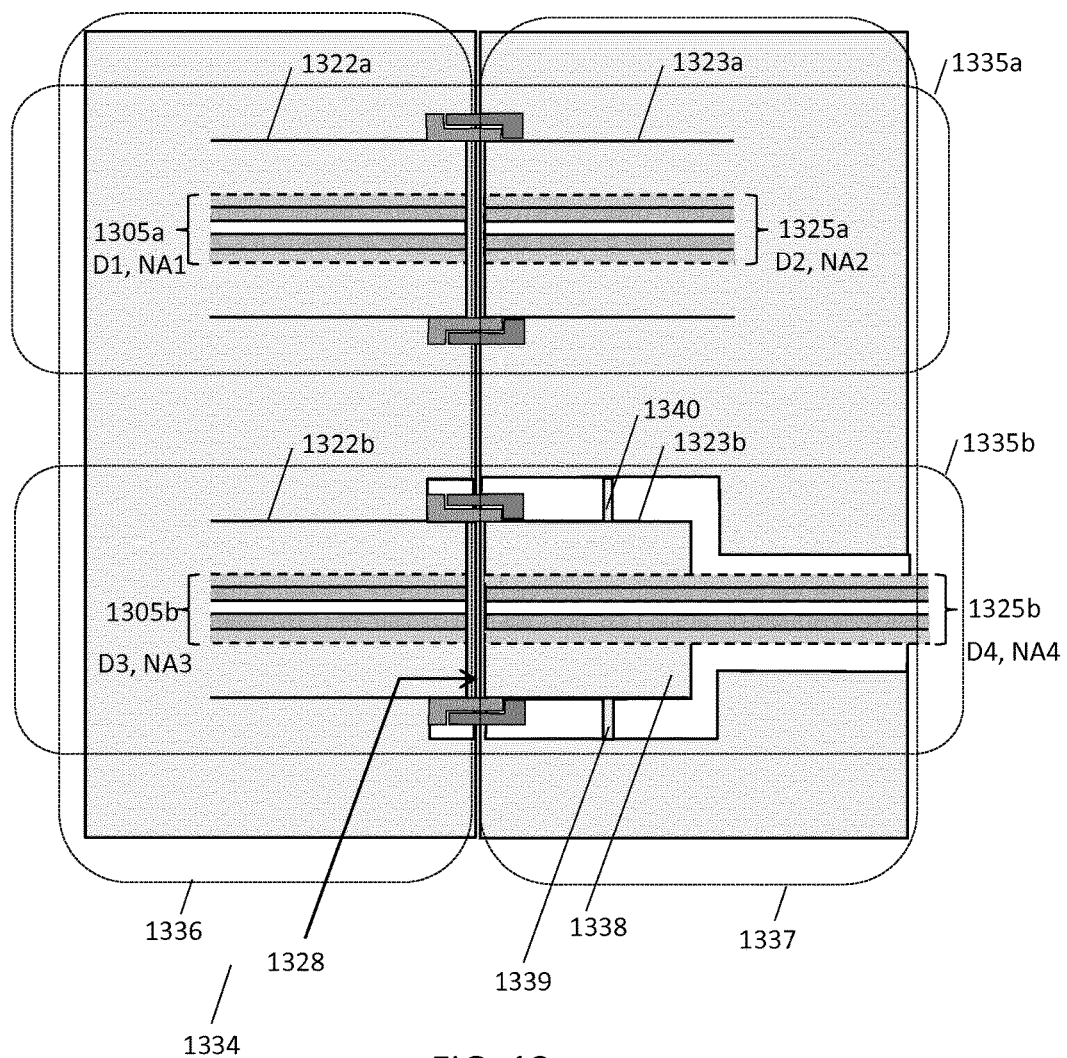
FIG. 13 illustrates an optical fiber connector housing (1334) wherein at least a portion (1338) of the body surrounding a counterpart optical fiber (1325b) in the socket (1337) housing is elastically coupled (1339, 1340) to the socket housing (1337) for providing an elastic force along the axis of the counterpart optical fiber (1325b) in a direction away from the end face (1328) of the counterpart optical fiber (1325b) and wherein each optical fiber (1305a, 1305b) in the plug housing (1336) is rigidly mechanically coupled to the plug housing (1336).

The following description of an optical fiber connector makes reference to its use in the medical field. Particular reference is made to its use in low cost disposable connector applications, however it is to be further appreciated that the invention also finds application in the interconnection of optical fibers in the general field of optical fiber interconnection.

According to one aspect of the invention an optical fiber connector comprises a body having a bore that is configured to receive an optical fiber. The optical fiber connector further includes an optical fiber having an end face and a core that is surrounded by a cladding layer; wherein the cladding layer is surrounded by a buffer layer for at least a portion of the axial extent of the optical fiber. The optical fiber is arranged within the bore.

According to another aspect of the invention an optical fiber connector comprises a body having a bore that is configured to receive an optical fiber. The optical fiber connector optionally further includes an alignment sleeve that is arranged coaxially with the bore. The optical fiber connector further includes an optical fiber having an end face and a core that is surrounded by a cladding layer; wherein the cladding layer is surrounded by a buffer layer. The optical fiber is arranged within the bore; and at least at the end face of the optical fiber the buffer layer of the optical fiber surrounds the cladding layer.

The conventional method of assembling an optical fiber connector is to strip the buffer layer from the optical fiber at its tip. The stripped tip is then inserted into a ferrule and the optical fiber is fixed within the ferrule with adhesive. The optical fiber is then cleaved to remove excess fiber at the tip, and polished back to the end face of the ferrule. Consequently the conventional method of assembling an optical fiber connector results in the portion at its tip comprising a core that is surrounded by a cladding layer, which is itself surrounded by adhesive that is surrounded by the ferrule. In the present invention the buffer layer is present at the tip of the optical fiber. The technical effect of leaving the buffer on the optical fiber is a simplified manufacturing process because the optical fiber is not stripped prior to the assembly of the connector. The robustness of the manufacturing process is further improved because during assembly of the optical fiber connector the buffer layers fs presence makes the optical fiber more robust and less prone to breakage. Advantageously it has been found that when the optical fiber connector is constructed in this way the optical fiber is adequately mechanically fixed within the connector body.

The optional alignment sleeve operates to improve alignment of the optical fiber connector with a corresponding optical fiber connector. In one configuration the alignment sleeve is arranged coaxially with the bore for improving the alignment of an optical fiber within the bore. In another configuration the optical fiber connector has an axis and an alignment sleeve is arranged coaxially with the optical fiber connector axis. The latter configuration allows, for example, for the alignment of optical fiber connectors where the connector has an axis that is not aligned with the bore, and, for example, for the alignment of optical fiber connectors wherein each optical fiber connector has more than one optical fibers, or more than one bore. In another configuration there is no alignment sleeve at all. Other alignment features such as alignment pins, alignment notches or alignment groves may alternatively or additionally be used to improve alignment of the optical fiber connector with a corresponding optical fiber connector.

According to another aspect of the invention the buffer layer of the optical fiber is in contact with the inner surface of the bore. In one envisaged process for forming the connector the body is formed from a plastic that is moulded around the optical fiber and this results in the buffer layer of the optical fiber being in contact with the inner surface of the bore. An envisaged method of manufacturing the optical fiber connector comprises the steps of: inserting an optical fiber having a core that is surrounded by a cladding layer and which is surrounded by a buffer layer within a body mould comprising a fixed volume that is bounded by two end faces such that the optical fiber extends through both end faces; and moulding a plastic body axially along the length of the optical fiber between the two end faces of the body mould; wherein for at least the portion of the optical fiber between the two end faces of the body mould the buffer layer of the optical fiber surrounds the cladding layer; and cleaving the optical fiber beyond the end face of the body mould; and polishing the end face of the cleaved optical fiber; and removing the optical fiber from the body mould. In another envisaged process for forming the optical fiber connector the optical fiber is mechanically fixed within a pre-formed connector body with adhesive and consequently at the tip of the optical fiber within the body there is an adhesive layer between the buffer layer and the bore of the connector.

According to another aspect of the invention the optical fiber connector includes a positive lens that is arranged within the alignment sleeve. The positive lens operates to collimate light from the optical fiber. Preferably the focal point of the positive lens is at the end face of the optical fiber. Such collimation means is advantageous in optical sensing applications wherein collimation of the beam emerging from the optical fiber improves the directivity of an optical beam delivered by the optical fiber, or the directivity of its sensitivity. When the optical fiber connector is mated with a counterpart optical fiber connector also having such a positive lens, light is communicated between the cores to the optical fibers in each connector. Reduced sensitivity to misalignment errors is achieved by such a configuration because the mating between the two connectors occurs at a wide point in the optical beam, thereby reducing the optical coupling loss between the two optical fibers. In another arrangement the end face of the optical fiber is defocused respective the positive lens. In this configuration a more relaxed alignment tolerance between the optical fiber core and the positive lens can be achieved at the expense of a higher connector insertion loss.

According to another aspect of the invention there is an air gap between the end face of the optical fiber and the positive lens. Such an air gap is optional and advantageously reduces wear between the lens and the optical fiber during temperature fluctuations that affect the dimensions of the optical fiber connector. Such an air gap may be used to accommodate the focal length of the positive lens.

According to another aspect of the invention the positive lens is in contact with the end face of the optical fiber. Such a configuration provides more repeatable collimation characteristics because by the collimation of the positive lens is not affected by variations in the gap between the positive lens and the end face of the optical fiber during assembly.

According to another aspect of the invention the end face of the optical fiber and positive lens are separated by a region of optical index matching material having a refractive index within 10% of the refractive index of either the core of the optical fiber or of the positive lens. The optical index matching material may be a liquid, an adhesive or a gel or an optical grease, for example. Such optical index matching reduces the optical coupling loss of the connector.

According to another aspect of the invention the alignment sleeve of the optical connector extends coaxially with the bore beyond the axial extent of the end face of the optical fiber in a direction away from the optical fiber. Such a configuration protects the end face of the optical fiber, reducing its susceptibility to wear and the collection of debris which may affect the optical performance of the optical fiber connector.

According to another aspect of the invention the optical fiber connector includes a positive lens and the alignment sleeve extends coaxially with the bore beyond the axial extent of the positive lens in a direction away from the optical fiber. Such a configuration protects the outermost face of the positive lens, reducing its susceptibility to wear and the collection of debris which may affect the optical performance of the optical fiber connector.

According to another aspect of the invention the optical fiber connector further includes a stop flange. The stop flange operates to set the distance between the end faces of the cores of two corresponding optical fibers in optical communication with each other. Consequently more repeatable optical transfer characteristics between the two optical fibers may be achieved.

According to another aspect of the invention the alignment sleeve is tapered. Such a configuration assists in the mating of one optical fiber connector with another optical fiber connector.

According to another aspect of the invention for at least a portion of the axial extent of the bore the buffer layer is removed. For that portion either the cladding layer is in optical contact with the body via an optical medium having a real part of refractive index that is greater than or equal to the refractive index of the cladding layer; or the cladding layer is in contact with the body and the body is formed from a material having a real part of refractive index that is greater than or equal to the refractive index of the cladding layer. Such a configuration operates as a cladding mode stripper, causing light that is transported along the length of the optical fiber by the cladding, to leak into the body of the connector, or into the optical medium. Any misalignment of the cores of the optical fibers that are in communication by means of two mated optical fiber connectors results in additional light being carried by the cladding layer, or so-called cladding modes. Variations in the core diameter of two such optical fibers also result in such cladding modes. Such modes generally diminish after about 10 meters of optical fiber as they are poorly guided. However, when short optical fiber lengths in the order of a few meter or less are used with optical fiber connectors, their length is inadequate for the cladding modes to diminish. Consequently the use of short optical fibers with optical connectors can result in significant power in the cladding. In for example tissue sensing optical spectroscopy applications which deliver light from the tip of an optical fiber the cladding modes may deliver unwanted, poorly directed optical radiation into the tissue that is sensed, confounding measurements. Consequently the use of this configuration as a cladding mode stripper within the optical fiber connector improves the repeatability of the optical transfer characteristics of the optical fibers, thereby improving the quality of the optical spectroscopy measurements. The optical medium used in stripping the cladding modes may for example be a polymer layer, or an adhesive layer or a gel layer or an optical grease layer; and/or the body may formed from polyimide; these materials meeting the desired refractive index criteria. The optical medium or the polyimide may further include a plurality of scattering centres having a volume diameter in the range of 0.1 to 1.0 microns. The density of such centres may exceed 1000 per $cm^3$, such a diameter and density being favourable to the scattering of optical wavelengths and thereby improving the attenuation of the cladding modes.

The buffer may be removed using conventional methods such as a mechanical stripping tool, a solvent such as dichloromethane, hot sulphuric acid, or for example by heating such as in a flame or using a laser.

The aforementioned aspects of the optical fiber connector may in isolation or in any selected combination be used in an optical fiber connector arrangement, and in an optical fiber connector housing.

According to another aspect of the invention an optical fiber connector arrangement is disclosed which comprises a first optical fiber connector that is mated with a corresponding counterpart optical fiber connector. Such a configuration may be used to communicate light between the cores of the optical fibers within the two optical fiber connectors, via their respective end faces. In some embodiments in which an alignment sleeve is used this may be achieved by for example by arranging that the alignment sleeve of the first optical fiber connector has an outer diameter that is configured to fit within the inner diameter of the counterpart alignment sleeve of the counterpart optical fiber connector, and vice versa. In other embodiments no alignment sleeve is used. Other mating configurations are also possible.

According to another aspect of the invention an optical fiber connector arrangement comprising a first optical fiber connector and a counterpart optical fiber connector is disclosed wherein the optical fiber of the first optical fiber connector has a core diameter D1 and a Numerical Aperture NA1; and wherein the counterpart optical fiber in the counterpart optical fiber connector has a core diameter D2 and a Numerical Aperture NA2; wherein at least one of the ratio (D1/D2) or the ratio (NA1/NA2) either exceeds 1.1 or is less than 0.9. In another configuration at least one of the ratio (D1/D2) or the ratio (NA1/NA2) either exceeds 1.15 or is less than 0.85. In another configuration at least one of the ratio (D1/D2) or the ratio (NA1/NA2) either exceeds 1.2 or is less than 0.8. In another configuration at least one of the ratio (D1/D2) or the ratio (NA1/NA2) either exceeds 1.5 or is less than 0.5. In another configuration at least one of the ratio (D1/D2) or the ratio (NA1/NA2) either exceeds 2 or is less than 0.25. A conventional specification for the Numerical Aperture of an optical fiber that is not covered by these ranges is 0.37+/−0.02; this conventional range being desirably minimized in order to reduce optical coupling loss between optical fibers. The use of optical fibers having differing core diameter and/or differing numerical aperture optical fiber connector arrangement relaxes the alignment tolerance requirements of the cores of the optical fibers. This consequently permits the use of simpler, cheaper processes for manufacturing the connector.

These arrangements may be used with any of the previously described optical fiber connector aspects. As one example they may be used with the previously described optical fiber connector which comprises a body having a bore that is configured to receive an optical fiber. The optical fiber connector further includes an optical fiber having an end face and a core that is surrounded by a cladding layer; wherein the cladding layer is surrounded by a buffer layer for at least a portion of the axial extent of the optical fiber. The optical fiber is arranged within the bore. As another example these arrangements may be used with the previously described optical fiber connector which comprises a body having a bore that is configured to receive an optical fiber. The optical fiber connector optionally further includes an alignment sleeve that is arranged coaxially with the bore. The optical fiber connector further includes an optical fiber having an end face and a core that is surrounded by a cladding layer; wherein the cladding layer is surrounded by a buffer layer. The optical fiber is arranged within the bore; and at least at the end face of the optical fiber the buffer layer of the optical fiber surrounds the cladding layer.

In a preferred example, light may be guided from a narrow core diameter source, or light source, or light-sourcing, or light-delivery optical fiber having core diameter D1 to a wider core diameter collection, or light-collection, or light-receiving optical fiber having a core diameter D2 by the optical fiber connector arrangement wherein the ratio D1/D2 is less than 0.9, or is less than 0.85, or is less than 0.8, or is less than 0.5, or is less than 0.25, resulting in a relaxed alignment tolerance requirement, low insertion loss, and low coupling into the cladding of the collection optical fiber. Likewise the Numerical Aperture of the source and collection optical fibers may be controlled to achieve the same effect. Thus, in another example, light may be guided from a source, or light source, or light-sourcing, or light-delivery optical fiber having a Numerical Aperture NA1 to a collection, or light-collection, or light-receiving optical fiber having a Numerical Aperture NA2 by the optical fiber connector arrangement wherein the ratio NA1/NA2 is less than 0.9, or is less than 0.85, or is less than 0.8, or is less than 0.5, or is less than 0.25, resulting in a relaxed alignment tolerance, low insertion loss and low coupling into the cladding of the collection optical fiber.

In another example, light may be guided from a large core diameter source, or light source, or light-sourcing, or light-delivery optical fiber having core diameter D1 to a smaller core diameter collection, or light-collection, or light-receiving optical fiber having a core diameter D2 by the optical fiber connector arrangement wherein the ratio D1/D2 exceeds 1.1, or exceeds 1.15, or exceeds 1.2, or exceeds 1.5, or exceeds 2, resulting in a relaxed alignment tolerance requirement at the expense of increased insertion loss and increased coupling into the cladding of the collection optical fiber. Likewise the Numerical Aperture of the source and collection optical fibers may be controlled to achieve the same effect. Thus, in another example, light may be guided from a source optical fiber having a Numerical Aperture NA1 to a collection, or light-collection, or light-receiving optical fiber having a Numerical Aperture NA2 by the optical fiber connector arrangement wherein the ratio NA1/NA2 exceeds 1.1, or exceeds 1.15, or exceeds 1.2, or exceeds 1.5, or exceeds 2, resulting in a relaxed alignment tolerance requirement at the expense of increased insertion loss and increased coupling into the cladding of the collection optical fiber.

In optical sensing applications where optical source power is plentiful, such configurations can be used to ensure that adequate light is communicated between the two optical fiber cores. The efficiency of light transfer between two optical fibers may be improved using the optical fiber connector arrangement by transmitting light from a narrow core diameter optical fiber via the optical fiber connector arrangement to a wider core diameter optical fiber. Any misalignment of the cores of the two optical fibers results in a reduced insertion loss as compared to the use of core diameters having substantially the same size owing to the wider core diameter of the light-receiving optical fiber. The same situation holds for the transmission of light from a low NA source optical fiber to a high NA collection optical fiber. In one contemplated optical spectroscopy application that uses the optical fiber connector arrangement, light is delivered from a wide core optical fiber, via the optical fiber connector arrangement to an optical sensing site at the distal end of needle via a narrower core optical fiber. Light scattered by the sensing site is collected via a separate optical path comprising a second narrow core optical fiber that transmits the collected light to a detector via a second optical fiber connector and a wider core diameter optical fiber. The insertion loss of the first optical fiber connector in the light delivery path is mitigated by the availability of high optical source power, whilst in the detection path, low insertion loss is provided by the narrow to wide core transition in spite of any misalignment of the cores. Consequently in such an optical fiber connector arrangement, low cost narrow diameter optical fibers that fit within the bore of the optical sensing needle are provided with a cheaper connector having a degraded alignment tolerance requirement.

According to another aspect of the invention an optical fiber connector arrangement (935) is disclosed in which the end faces of the two optical fibers configured for optical communication are in physical contact. Such physical contact reduces the insertion loss of the optical connector and removes the insertion loss variability on the separation between their end faces. An optional air gap (921) may be used to separate the end faces of the two optical fibers in order to reduce the damaging effects of wear on the end faces of the optical fibers.

According to another aspect of the invention an optical fiber connector arrangement comprises two mated optical fiber connectors wherein the alignment sleeve of each optical fiber connector has a radial stop flange. The axial position of the radial stop flange and the stop flange of each optical fiber connector respective the axis of the bore within the body of each connector determines the relative separation of the end faces of the cores of an optical fiber and a counterpart optical fiber. By setting the relative separation of the end faces with the stop flange and the radial stop flange, accurate optical insertion loss of the connector can be achieved.

According to another aspect of the invention an optical fiber connector arrangement comprises two mated optical fiber connectors wherein the stop flange and the radial stop flange are configured to leave a gap between the end faces of the cores of two optical fibers. Optionally the gap may be filled with a gel layer or an optical grease layer having a refractive index within 10% of the refractive index of the core (907, 924) of at least one of the two optical fibers in order to reduce the insertion loss of the connector.

According to another aspect of the invention an optical fiber connector arrangement comprises a first optical fiber connector and a counterpart optical fiber connector, wherein each optical fiber connector further includes a positive lens within its alignment sleeve. Each positive lens may be arranged respective the end face of its optical fiber to perform collimation of light carried by that optical fiber. Advantageously the combined effect of the two positive lenses is to reduce the susceptibility of the optical connector to insertion losses caused by misalignment of the cores of their optical fibers.

According to another aspect of the invention an optical fiber connector arrangement comprises a first optical fiber connector and a counterpart optical fiber connector wherein each of the alignment sleeve of the first optical fiber connector and the corresponding counterpart alignment sleeve of the counterpart optical fiber connector has a cross section in a plane that is perpendicular to its bore that is non-rotationally symmetric about its bore. Such a configuration prevents mating the first optical fiber connector and a counterpart optical fiber connector with an undesirable axial rotational configuration. This aspect of the invention finds further application when two or more optical fiber connector arrangements are combined together in an optical fiber connector housing and ensures that mating can only occur between each first optical fiber connector and its corresponding counterpart optical fiber connector in one configuration.

According to another aspect of the invention an optical fiber connector housing comprises two or more optical fiber connector arrangements; wherein every first optical fiber connector is retained within a plug housing, and wherein every counterpart optical fiber connector is retained within a socket housing. One of the optical fiber connector arrangements has an optical fiber with a core diameter D1 and a Numerical Aperture NA1 and a counterpart optical fiber with a core diameter D2 and a Numerical Aperture NA2. The second and further optical fiber connector arrangements each have an optical fiber with a core diameter D3 and a Numerical Aperture NA3 and a counterpart optical fiber with a core diameter D4 and a Numerical Aperture NA4; wherein at least one of the ratio (D1/D2) or the ratio (NA1/NA2) either exceeds 1.1 or is less than 0.9, or exceeds 1.15 or is less than 0.85, or exceeds 1.2 or is less than 0.8; and wherein at least one of the ratio (D3/D4) or the ratio (NA3/NA4) lies within the range 0.9 to 1.1 or lies within the range 0.85 to 1.15. Such a configuration has been found to be particularly useful in minimizing the sensitivity of the cores of the optical fibers in the connector to misalignment errors. This has been found to be particularly useful in an optical spectroscopy application that includes an optical sensing needle.

According to another aspect of the invention an optical fiber connector housing is disclosed wherein at least a portion of the body surrounding each counterpart optical fiber in the socket housing is elastically coupled to the socket housing for providing an elastic force along the axis of the counterpart optical fiber in the direction away from the end face of the counterpart optical fiber and wherein each optical fiber in the plug housing is rigidly mechanically coupled to the plug housing. The elastic coupling may be for example a metal or plastic spring or a compressible metal or plastic arm or member anchored between the body and the socket housing to act as an elastic coupling. The elastic coupling provides elasticity along the axis of the counterpart optical fiber such that when the counterpart optical fiber connector in the socket housing is mated with the corresponding optical fiber connector in the plug housing the end face of the counterpart optical fiber is elastically held against the corresponding end face of the optical fiber in the corresponding plug housing. The elastic coupling improves the light coupling between the cores of the two optical fibers, thereby reducing the sensitivity to manufacturing tolerances of the optical fiber connector along the axis of the optical fiber bore.

According to another aspect of the invention an optical fiber connector housing comprises an alignment feature having a male portion and a corresponding female portion. The male portion of the alignment feature is a protrusion that is fixably mounted to an alignment sleeve of the first optical fiber connector in the plug housing; and the female portion of the alignment feature is a groove that corresponds with the protrusion and which is fixably mounted to a counterpart alignment sleeve of a corresponding counterpart optical fiber connector in the socket housing. The male portion and the female portion are configured such that they are coincident when the two or more optical fiber connector arrangements are mated. Such an alignment feature ensures that the first optical fiber connector in the plug housing can only be mated with the counterpart optical fiber connector in the socket housing in one orientation.

According to another aspect of the invention an optical fiber connector arrangement or an optical fiber connector housing further includes a locking mechanism for temporarily fixing the relative axial positions of at least the optical fiber and the counterpart optical fiber; wherein a male portion of the locking mechanism is fixably attached to a first optical fiber connector and wherein a corresponding female portion of the locking mechanism is fixably attached to a counterpart optical fiber connector and wherein the male portion of the locking mechanism and the female portion of the locking mechanism are in a locked state when the optical fiber and the counterpart optical fiber are mated; and wherein the locking mechanism is selected from the group: a screw connector, a twist-lock connector, a snap connector, a bayonet connector.

According to another aspect of the invention a medical optical spectroscopy device includes the optical fiber connector or the optical fiber connector arrangement. Such can be used in the medical optical spectroscopy device to improve the susceptibility to misalignment tolerances of temporarily connected optical fibers. The optical spectroscopy device may for example be a so-called photonic needle optical spectroscopy device configured for supplying and measuring optical signals relating to tissue at the tip of a needle.

According to another aspect of the invention the use of the optical fiber connector in a medical optical spectroscopy device is disclosed. The medical optical spectroscopy device may for example be a so-called photonic needle optical spectroscopy device configured for supplying and measuring optical signals relating to tissue at the tip of a needle.

The body of the optical fiber connector may for example be formed from a plastic, including for example Nylon, HDPE, Polystyrene, Polycarbonate, polyamide, ABS.

The alignment sleeve of the optical fiber connector may for example be formed from a plastic, including for example Nylon, HDPE, Polystyrene, Polycarbonate, polyamide, ABS or from a metal.

The positive lens used in the optical fiber connector, which may be a ball lens as illustrated in the Figures or alternatively any positive lens including a plano-convex lens, a bi-convex lens or a Fresnel lens may for example be formed from a glass or a polymer.

The present invention is now described with reference to a number of Examples that are enumerated to illustrate the interdependence of their features.

$1^{st}$ EXAMPLE

1. An optical fiber connector (1) comprising:
a body (2) having a bore (3) configured to receive an optical fiber;
an optional alignment sleeve (4) that is arranged coaxially with the bore (3);
an optical fiber (5) having an end face (6), and a core (7) that is surrounded by a cladding layer (8); wherein the cladding layer (8) is surrounded by a buffer layer (9);
wherein the optical fiber (5) is arranged within the bore (3); and
wherein at least at the end face (6) the buffer layer (9) of the optical fiber (5) surrounds the cladding layer (8).

$2^{nd}$ EXAMPLE

2. An optical fiber connector according to Example 1 wherein at least at the end face (6) the buffer layer (9) of the optical fiber (5) is in contact with the inner surface (10) of the bore (3).

$3^{rd}$ EXAMPLE

3. An optical fiber connector (201) according to Example 1 further comprising a positive lens (211) having an optical axis (212);
wherein the positive lens (211) is arranged within the alignment sleeve (204) and wherein the optical axis of the positive lens (212) is aligned coaxially with the axis (213) of the bore (203).

$4^{th}$ EXAMPLE

4. An optical fiber connector (201) according to Example 3 wherein there is an air gap (214) between the end face (206) of the optical fiber (205) and the positive lens (211).

$5^{th}$ EXAMPLE

5. An optical fiber connector (301) according to Example 3 wherein the positive lens (311) is in contact with the end face (306) of the optical fiber (305).

$6^{th}$ EXAMPLE

6. An optical fiber connector (301) according to Example 3 wherein the end face (6) of the optical fiber and positive lens (211) are separated by a region of optical index matching material having a refractive index within 10% of the refractive index of either the core of the optical fiber or of the positive lens.

7th EXAMPLE

7. An optical fiber connector according to Example 1 wherein the alignment sleeve (4) extends coaxially with the bore (3) beyond the axial extent of the end face (6) of the optical fiber (5) in a direction away from the optical fiber (5).

8th EXAMPLE

8. An optical fiber connector according to Example 3 wherein the alignment sleeve (204, 304) extends coaxially with the bore (203, 303) beyond the axial extent of the positive lens (211) in a direction away from the optical fiber (5).

9th EXAMPLE

9. An optical fiber connector (1, 201, 301) according to any previous Example wherein the alignment sleeve (4, 204, 304) has a distal end that is furthest from the optical fiber; wherein the distal end of the alignment sleeve (4, 204, 304) further comprises a stop flange (14, 214, 314); wherein the stop flange is arranged coaxially with the bore; and wherein the stop flange has an end face that lies in a perpendicular plane to the longitudinal axis of the bore.

10th EXAMPLE

10. An optical fiber connector according to any previous Example wherein the alignment sleeve (414, 514, 614) is tapered.

11th EXAMPLE

11. An optical fiber connector (701, 801) according to any previous Example wherein for at least a portion (715, 815) of the axial extent of the bore the buffer layer (709, 809) is removed; and wherein for that portion (715, 815) either the cladding layer (708) is in optical contact with the body (702) via an optical medium (716) having a real part of refractive index that is greater than or equal to the refractive index of the cladding layer (708); or the cladding layer (808) is in contact with the body (802) and the body (802) is formed from a material having a real part of refractive index that is greater than or equal to the refractive index of the cladding layer (808).

12th EXAMPLE

12. An optical fiber connector (701, 801) according to Example 11 wherein the optical medium (716) is an adhesive layer or a gel layer or an optical grease layer; and/or the body is formed from polyimide.

13th EXAMPLE

13. An optical fiber connector (701, 801) according to Example 12 wherein at least one of the optical medium (716) or the polyimide further includes a plurality of scattering centres having a volume diameter in the range of 0.1 to 1.0 microns.

14th EXAMPLE

14. An optical fiber connector arrangement (935) comprising a first optical fiber connector (922) according to Example 1 mated with a corresponding counterpart optical fiber connector (923) according to Example 1; wherein the body (902) of the first optical fiber connector (922) corresponds with a counterpart body (927) of the counterpart optical fiber connector (923) having a counterpart bore (920) that is configured to receive a counterpart optical fiber (925);

wherein the alignment sleeve (904) of the first optical fiber connector (922) corresponds with a counterpart alignment sleeve (917) of the counterpart optical fiber connector (923) that is arranged coaxially with the counterpart bore (920); and wherein the optical fiber (905) of the of the first optical fiber connector (922) corresponds with a counterpart optical fiber (925) of the counterpart optical fiber connector (923) having a counterpart end face (928) and a counterpart core (924) that is surrounded by a counterpart cladding layer (929); wherein the counterpart cladding layer (929) is surrounded by a counterpart buffer layer (930);

and wherein the counterpart optical fiber (925) is arranged within the counterpart bore (920) of the counterpart optical fiber connector (923);

and wherein at least at the counterpart end face (928) the counterpart buffer layer (930) of the counterpart optical fiber (925) surrounds the counterpart cladding layer (929); and wherein the core (907) of the optical fiber (905) of the first optical fiber connector (922) is arranged coaxially with the counterpart core (924) of the counterpart optical fiber (925) in the counterpart optical fiber connector (923).

15th EXAMPLE

15. An optical fiber connector arrangement (935) according to Example 14 wherein:

the optical fiber (905) of the first optical fiber connector (922) has a core diameter D1 and a Numerical Aperture NA1; and wherein the counterpart optical fiber (925) of the counterpart optical fiber connector (923) has a core diameter D2 and a Numerical Aperture NA2;

wherein at least one of the ratio (D1/D2) or the ratio (NA1/NA2) either exceeds 1.1 or is less than 0.9.

16th EXAMPLE

16. An optical fiber connector arrangement (935) according to Example 14 or Example 15 wherein the end face (906) of the optical fiber (905) in the first optical fiber connector (922) is in contact with the end face (928) of the counterpart optical fiber (925) in the counterpart optical fiber connector (923).

17th EXAMPLE

17. An optical fiber connector arrangement (935) according to Example 14; wherein the alignment sleeve (904) of the first optical fiber connector (922) extends axially beyond and away from the optical fiber (905) within its bore (903) and further includes a stop flange (914) and a radial stop flange (918); wherein the stop flange (914) of the first optical fiber connector (922) comprises the end face of its alignment sleeve (904) that is furthermost from the optical fiber (905) within its bore (903) and which stop flange (914) lies in a plane that is perpendicular to the longitudinal axis of the bore (903) of the first optical fiber connector (922); and wherein the radial stop flange (918) of the first optical fiber connector (922) is arranged coaxially with the bore (903) of the first optical fiber connector (922) and which radial stop flange (918) lies in a plane that is both perpendicular to the longitudinal axis of the bore (903) of the first optical fiber connector (922) and which intersects the bore (903) of the first optical fiber connector (922); and wherein the counterpart alignment sleeve (917) of the counterpart optical fiber connector (923) extends axially beyond and away from the counterpart optical fiber (925) within its bore (920) and further includes a counterpart stop flange (919) and a counterpart radial stop flange (926); wherein the counterpart stop flange (919) of the counterpart optical fiber connector (923) comprises the end face of its alignment sleeve (917) that is furthermost from the counterpart optical fiber (925) within its bore (920) and which counterpart stop flange (919) lies in a plane that is perpendicular to the longitudinal axis of the counterpart bore (920) of the counterpart optical fiber connector (923); and wherein the counterpart radial stop flange (926) of the counterpart optical fiber connector (923) is arranged coaxially with the counterpart bore (920) of the counterpart optical fiber connector (923) and which counterpart radial stop flange (926) lies in a plane that is both perpendicular to the longitudinal axis of the counterpart bore (920) of the counterpart optical fiber connector (923) and which intersects the counterpart bore (920) of the counterpart optical fiber connector (923).

18$^{th}$ EXAMPLE

18. An optical fiber connector arrangement (935) according to Example 17 wherein the axial positions of the stop flange (914) and the radial stop flange (918) of the first optical fiber connector (922), and the axial positions of the counterpart stop flange (919) and the counterpart radial stop flange (926) of the counterpart optical fiber connector (923), respective the common axis shared by the core (907) of the optical fiber (905) in the first optical fiber connector (922) and the counterpart optical fiber (925) in the counterpart optical fiber connector (923) are configured to leave a gap (921) between the mutually opposing end faces (906, 928) of the two optical fibers (905, 925).

19$^{th}$ EXAMPLE

19. An optical fiber connector arrangement according to Example 17 wherein the gap (921) is filled with a gel layer or an optical grease layer having a refractive index within 10% of the refractive index of the core (907, 924) of at least one of the two optical fibers (905, 925).

20$^{th}$ EXAMPLE

20. An optical fiber connector arrangement according to any one of Examples 14-17 wherein the first optical fiber connector (1022) further includes a positive lens (1011) that is arranged within its alignment sleeve (1004); wherein the optical axis (1012) of the positive lens (1011) is aligned coaxially with the axis (1013) of the bore (1003) of the first optical fiber connector (1022); and wherein the counterpart optical fiber connector (1023) further includes a corresponding counterpart positive lens (1031) that is arranged within its alignment sleeve (1017); wherein the optical axis (1032) of the counterpart positive lens (1031) is aligned coaxially with the axis (1033) of the counterpart bore (1020) of the counterpart optical fiber connector (1023).

21$^{st}$ EXAMPLE

21. An optical fiber connector arrangement (935, 1035, 1135) according to Example 14 wherein the alignment sleeve (904, 1004, 1104) of the first optical fiber connector (922, 1022, 1122) has an outer diameter that is configured to fit within the inner diameter of the counterpart alignment sleeve (917, 1017, 1117) of the counterpart optical fiber connector (923, 1023, 1123).

22$^{nd}$ EXAMPLE

22. An optical fiber connector arrangement (935) according to Example 14 wherein each of the alignment sleeve (904) of the first optical fiber connector (922) and the corresponding counterpart alignment sleeve (917) of the counterpart optical fiber connector (923) has a cross section in a plane that is perpendicular to its bore (903, 920) that is non-rotationally symmetric about its bore (903, 920).

23$^{rd}$ EXAMPLE

23. An optical fiber connector housing (1234, 1334) comprising two or more optical fiber connector arrangements (1235a, 1235b) according to Example 14; wherein every first optical fiber connector (1205a, 1205b) is retained within a plug housing (1236), and wherein every counterpart optical fiber connector (1225a, 1225b) is retained within a socket housing (1237); and wherein one of the optical fiber connector arrangements (1235a) has an optical fiber (1205a) with a core diameter D1 and a Numerical Aperture NA1 and a counterpart optical fiber (1225a) with a core diameter D2 and a Numerical Aperture NA2; and the counterpart and further optical fiber connector arrangements (1222b, 1223b) each have an optical fiber (1205b) with a core diameter D3 and a Numerical Aperture NA3 and a counterpart optical fiber (1225b) with a core diameter D4 and a Numerical Aperture NA4; wherein at least one of the ratio (D1/D2) or the ratio (NA1/NA2) either exceeds 1.1 or is less than 0.9; and wherein at least one of the ratio (D3/D4) or the ratio (NA3/NA4) lies within the range 0.9 to 1.1.

24$^{th}$ EXAMPLE

24. An optical fiber connector housing (1334) according to Example 23 wherein at least a portion (1338) of the body surrounding each counterpart optical fiber in the socket housing is elastically coupled (1339, 1340) to the socket housing (1337) for providing an elastic force along the axis of the counterpart optical fiber (1325b) in the direction away from the end face (1328) of the counterpart optical fiber and wherein each optical fiber (1305a, 1305b) in the plug housing is rigidly mechanically coupled to the plug housing (1336).

25$^{th}$ EXAMPLE

25. An optical fiber connector housing (1334) according to Example 23 further comprising an alignment feature having a male portion and a corresponding female portion; wherein the male portion of the alignment feature is a protrusion that is fixably mounted to an alignment sleeve of the first optical fiber connector in the plug housing; and wherein the female portion of the alignment feature is a groove that corresponds with the protrusion and which is fixably mounted to a counterpart alignment sleeve of a corresponding counterpart optical fiber connector in the socket housing; wherein the male portion and the female portion are coincident when the two or more optical fiber connector arrangements are mated.

26th EXAMPLE

26. An optical fiber connector arrangement or an optical fiber connector housing according to any one of Examples 14, 25 further comprising a locking mechanism for temporarily fixing the relative axial positions of at least the optical fiber and the counterpart optical fiber; wherein a male portion of the locking mechanism is fixably attached to a first optical fiber connector and wherein a corresponding female portion of the locking mechanism is fixably attached to a counterpart optical fiber connector; wherein the male portion of the locking mechanism and the female portion of the locking mechanism are in a locked state when the optical fiber and the counterpart optical fiber are mated; and wherein the locking mechanism is selected from the group: a screw connector, a twist-lock connector, a snap connector, a bayonet connector.

27th EXAMPLE

27. A medical optical spectroscopy device comprising the optical fiber connector of Example 1 or the optical fiber connector arrangement of Example 14.

28th EXAMPLE

28. A method of manufacturing an optical fiber connector of any previous Example comprising the steps of:
    inserting an optical fiber having a core that is surrounded by a cladding layer and which is surrounded by a buffer layer within a body mould comprising a fixed volume that is bounded by two end faces such that the optical fiber extends through both end faces;
    moulding a plastic body axially along the length of the optical fiber between the two end faces of the body mould; wherein for at least the portion of the optical fiber between the two end faces of the body mould the buffer layer of the optical fiber surrounds the cladding layer;
    cleaving the optical fiber beyond the end face of the body mould;
    polishing the end face of the cleaved optical fiber;
    removing the optical fiber from the body mould.

29th EXAMPLE

29. Use of the optical fiber connector of claim 1 in a medical optical spectroscopy device.

To summarise, an optical fiber connector for interconnecting optical fibers has been disclosed with reference to an exemplary application of delivering light and performing optical measurements at the tip of a needle in a medical device. The disposable nature of the needle in such applications creates an opportunity for optical fiber connectors in the delivery of light to the tip of the needle and in its collection from the tip of the needle that are low cost and simple to manufacture. Various aspects of the connector, including its incorporation in an arrangement and in a housing have been described.

Whilst the invention has been illustrated and described in detail in the drawings and foregoing description, such illustrations and description are to be considered illustrative or exemplary and not restrictive; the invention is not limited to the disclosed embodiments and can be used for optically connecting optical fibers in various applications both in and beyond the medical field.

The invention claimed is:
1. An optical fiber connector arrangement comprising:
    a first optical fiber connector comprising:
        a body having a bore,
        a first optical fiber having an end face and a core that is surrounded by a cladding layer, wherein the cladding layer is surrounded by a buffer layer for at least a portion of an axial extent of the first optical fiber and the first optical fiber is arranged within the bore, and an alignment sleeve that is either i) arranged coaxially with the bore or ii) arranged coaxially with a first optical fiber connector axis, and
        a lens that contacts the end face of the first optical fiber; and
    a counterpart optical fiber connector comprising:
        a counterpart body having a counterpart bore,
        a counterpart optical fiber having a counterpart end face and a counterpart core that is surrounded by a counterpart cladding layer, wherein the counterpart cladding layer is surrounded by a counterpart buffer layer for at least a portion of the axial extent of the counterpart optical fiber and the counterpart optical fiber is arranged within the counterpart bore, the counterpart optical fiber connector comprising a counterpart alignment sleeve that is either i) arranged coaxially with the counterpart bore or ii) arranged coaxially with a counterpart optical fiber connector axis, wherein the alignment sleeve is configured to mate with the counterpart alignment sleeve, and
        a counterpart lens that contacts the counterpart end face of the counterpart optical fiber, wherein:
    A) for a first portion of the axial extent of the counterpart bore of the counterpart optical fiber connector, the counterpart buffer layer of the counterpart optical fiber is absent or removed; and wherein for the first portion either i) the counterpart cladding layer is in optical contact with the counterpart body via an optical medium having a real part of refractive index that is greater than or equal to the refractive index of the counterpart cladding layer; or ii) the counterpart cladding layer is in optical contact with the counterpart body and the counterpart body is formed from a material having a real part of refractive index that is greater than or equal to the refractive index of the counterpart cladding layer; or
    B) for a second portion of the axial extent of the bore of the first optical fiber connector, the buffer layer of the first optical fiber is absent or removed; and wherein for the second portion either i) the cladding layer is in optical contact with the body via an optical medium having a real part of refractive index that is greater than or equal to the refractive index of the cladding layer; or ii) the cladding layer is in optical contact with the body and the body is formed from a material having a real part of refractive index that is greater than or equal to the refractive index of the cladding layer;
    the alignment sleeve is tapered and the counterpart alignment sleeve is tapered in a complementary manner to a taper of the first alignment sleeve;
    the alignment sleeve has an outer diameter that is configured to fit within an inner diameter of the counterpart alignment sleeve of the counterpart optical fiber connector; and
    the alignment sleeve has a stop flange disposed annularly around the alignment sleeve and adapted to engage a complementary annularly disposed stop flange of the counterpart alignment sleeve and prevent linear movement of the counterpart alignment sleeve when engaged.

2. The optical fiber connector arrangement according to claim 1, wherein at the end face of the first optical fiber of the first optical fiber connector, the buffer layer of the first optical fiber surrounds the cladding layer.

3. The optical fiber connector arrangement according to claim 2, wherein at the end face of the first optical fiber of the first optical fiber connector, the buffer layer of the first optical fiber is in contact with an inner surface of the bore.

4. The optical fiber connector arrangement according to claim 1, wherein:
the lens has an optical axis, wherein the lens is arranged within the alignment sleeve of the first optical fiber connector and the optical axis of the lens is aligned coaxial with the axis of the bore of the first optical fiber connector; and
the counterpart lens has a counterpart optical axis, wherein the counterpart lens is arranged within the counterpart alignment sleeve of the counterpart optical fiber connector and the counterpart optical axis of the counterpart lens is aligned coaxially with the axis of the bore of the counterpart optical fiber connector.

5. The optical fiber connector arrangement according to claim 1, wherein each of the alignment sleeve of the first optical fiber connector and the corresponding counterpart alignment sleeve of the counterpart optical fiber connector has a cross section in a plane that is perpendicular to its respective bore that is non-rotationally symmetric about its respective bore.

6. An optical fiber connector housing comprising two or more optical fiber connector arrangements according to claim 1, wherein:
every first optical fiber connector is retained within a plug housing and every counterpart optical fiber connector is retained within a socket housing;
one of the optical fiber connector arrangements has an optical fiber with a core diameter D1 and a Numerical Aperture NA1 and a counterpart optical fiber with a core diameter D2 and a Numerical Aperture NA2; and
a second and further optical fiber connector arrangements each has an optical fiber with a core diameter D3 and a Numerical Aperture NA3 and a counterpart optical fiber with a core diameter D4 and a Numerical Aperture NA4.

7. The optical fiber connector housing according to claim 6, wherein:
at least a portion of the body surrounding each counterpart optical fiber in the socket housing is elastically coupled to the socket housing to provide an elastic force along the axis of the counterpart optical fiber in a direction away from the end face of the counterpart optical fiber, and
each optical fiber in the plug housing is rigidly mechanically coupled to the plug housing.

8. A medical optical spectroscopy device comprising the optical fiber connector arrangement of claim 1.

9. A method of manufacturing an optical fiber connector of the optical fiber connector arrangement of claim 1, the method comprising:
inserting an optical fiber having a core that is surrounded by a cladding layer and which is surrounded by a buffer layer within a body mold comprising a fixed volume that is bounded by two end faces such that the optical fiber extends through both end faces;
molding a plastic body axially along a length of the optical fiber between the two end faces of the body mold; wherein for at least the portion of the optical fiber between the two end faces of the body mold the buffer layer of the optical fiber surrounds the cladding layer;
cleaving the optical fiber beyond the end face of the body mold;
polishing the end face of the cleaved optical fiber; and
removing the optical fiber from the body mold.

10. The optical fiber connector arrangement according to claim 1, wherein:
the first optical fiber received by the bore of the first optical fiber connector is a source optical fiber; and
the counterpart optical fiber received by the counterpart bore of the counterpart optical fiber connector is a collection optical fiber.

11. The optical fiber connector arrangement of claim 1, wherein an end face of the buffer layer surrounds the cladding layer and an end face of the counterpart buffer layer surrounds the counterpart cladding layer.

12. The optical fiber connector arrangement of claim 1, wherein the optical medium is an adhesive layer, a gel layer, or an optical grease layer.

13. The optical fiber connector arrangement of claim 1, wherein a density of the scattering centers of the optical medium exceeds 1000 per $cm^3$.

14. The optical fiber connector arrangement of claim 1, wherein the first optical fiber, which has the Numerical Aperture NA1, is a source of optical light transmitted to and received by the counterpart optical fiber, which has the counterpart Numerical Aperture NA2, and the ratio (NA1/NA2) exceeds 1.15.

15. The optical fiber arrangement of claim 1, wherein the first optical fiber of the first optical fiber connector has a core diameter D1 and a Numerical Aperture NA1, the counterpart optical fiber of the counterpart optical fiber connector has a counterpart core diameter D2 and a counterpart Numerical Aperture NA2, a first ratio (NA1/NA2) exceeds 1.15 or is less than 0.85, and a second ratio (D1/D2) is less than 0.9, and the second ratio (D1/D2) is less than 0.85, or is less than 0.8, or is less than 0.5, or is less than 0.25.

* * * * *